May 5, 1964 W. W. GAERTNER ETAL 3,132,258

PARAMETRIC AMPLIFIER USING PHOTO-CELL REACTANCE

Original Filed June 8, 1960 3 Sheets-Sheet 1

INVENTORS,
WESLEY G. MATTHEI &
WOLFGANG W. GAERTNER.
BY Jack H. Linscott
ATTORNEY.

PARAMETRIC AMPLIFIER USING PHOTO-CELL REACTANCE

Original Filed June 8, 1960 3 Sheets-Sheet 2

INVENTORS,
WESLEY G. MATTHEI &
WOLFGANG W. GAERTNER.
BY
Jack H. Linscott
ATTORNEY.

PARAMETRIC AMPLIFIER USING PHOTO-CELL REACTANCE

Original Filed June 8, 1960

3 Sheets-Sheet 3

INVENTORS,
WESLEY G. MATTHEI &
WOLFGANG W. GAERTNER.
BY Jack H. Linscott
ATTORNEY United States Patent Office 3,132,258
Patented May 5, 1964

3,132,258

PARAMETRIC AMPLIFIER USING PHOTO-CELL REACTANCE

Wolfgang W. Gaertner, Stamford, Conn., and Wesley G. Matthei, Neptune, N.J., assignors to the United States of America as represented by the Secretary of the Army Continuation of application Ser. No. 34,845, June 8, 1960. This application Mar. 29, 1963, Ser. No. 270,495
2 Claims. (Cl. 307—88)
(Granted under Title 35, U.S. Code (1952), sec. 266)

The invention described herein may be manufactured and used by or for the Government for governmental purposes, without the payment of any royalty thereon.

This application is a continuation of application Serial No. 34,845, filed June 8, 1960, now abandoned.

The invention relates to photoparametric control devices and particularly to such devices using a semiconductor surface-barrier photodiode operating in response to modulated light as a variable capacitance.

A general object of the invention is to translate efficiently the information on a suitably modulated light beam into another form of energy suitable for providing various types of control in a signal transmission system.

A more specific object is to detect and convert, efficiently and with high sensitivity, variable information in the form of intensity modulation of a light beam of given frequency into proportional electrical energy in amplified form at the same or different frequencies suitable for various system control uses.

The invention is more specifically directed to such devices employing the well known parametric amplifier principle or method. The theory and various applications of this method have been described in many articles in the literature including an article entitled, "Gain-Bandwidth and Noise Characteristics of Variable Parameter Amplifier" by Heffner and Wade, published in the Journal of Applied Physics, vol. 29, pg. 1321–31 (1958), and an article entitled, "The Variable-Capacitance Parametric Amplifier" by E. D. Reed, published in Bell Labs. Record, pp. 373–379, for October 1959. Briefly, the parametric amplifier method involves introducing a signal at a given frequency $w_1$ into a signal circuit, which discriminates against all other frequencies, and is coupled through the varying reactance of an energy storage element, such as a variable capacitor or inductor, to a second resonant circuit (usually called the idler or idling circuit) which is tuned to have a high Q at the difference frequency $w_2=w-w_1$. This reactance is varied by the "pump" or local A.-C. oscillator at a frequency $w$. The resulting time varying signal is then coupled again through the variable reactance and the idler circuit to the signal circuit in the correct phase, amplitude and frequency ($w_1$), is added on to the original exciting signal and is taken out of this circuit through an appropriate load resulting in a power gain of the original signal.

The devices in accordance with the invention entail the use of a non-linear (time varying) photoreactance controlled by a modulated light beam of a given frequency as an (ideally lossless) energy storage element which couples power from a "pump" by means of an idler circuit into an output electrical channel, resulting in an amplified, low noise, electrical signal output, or a generated signal, of the same or different frequency depending on the circuit parameters employed.

The non-linear photoreactance used in the system of the invention is a photodiode of the type devised by E. Ahlstrom and used as a variable photocapacitor in control circuits generally described in the article entitled, "Use of Surface-Barrier Photodiodes as Fast-Response Photocapacitors" by said E. Ahlstrom, and the present applicants W. G. Matthei, and W. W. Gaertner, published in the Review of Scientific Instruments, vol. 30, No. 7, pp. 592–593, July 1959. This photodiode comprises a surface-barrier or depletion layer photodiode or photocell which consists of a transparent metal film on a semiconductor crystal, such as a thin gold, silver or rhodium film plated on N-type silicon, the capacitance changes as a function of light intensity. Light of varying intensity comprising information modulating in amplitude a light beam of a given frequency $f_s$ directly applied to the sensitive metal film surface of such a photocell will cause the release of electrons entering the barrier or depletion layer between the metal and semiconductor surfaces to produce a varying current therein proportional to the varying intensity of the applied modulated signal beam. This current, through the self-biasing action of the internal resistance, will produce a varying voltage which in turn creates a proportional variable capacitance across the photocell.

This variable capacitance is varied at a frequency $f_p$ by the application thereto of pump power of that frequency. The modulated light beam generates an R.-F. current (of frequency $f_s$) in the signal circuit of which the photocell is an integral part. The signal current at the frequency $f_s$ and the capacitance variation at the frequency $f_p$, which is time varying (due to the pump action) are combined in the photocell to generate voltages of the sum and difference frequencies across the photocell, which, with the aid of the associated high Q idler circuit tuned to the difference frequency $f_p-f_s$, are converted into an amplified, low-noise electrical output signal which contains the information on the original modulated light beam. This circuit, depending on the various circuit parameters employed and the place where the output is taken, is capable of being used as a low noise amplifier or as a frequency converter. In the absence of a modulated control signal, by utilizing a more intense pump source, the circuit may be employed as a frequency generator to generate waves at either of two different frequencies.

A feature of the invention is the use of a second, more intense, modulated light beam applied to the photocell as a source in place of the usual electrical connection, to supply the power for the parametric amplifier or converter.

The various objects and features of the invention will be better understood from the following detailed description thereof when it is read in conjunction with the several figures of the drawings, in which.

Figure 1B:
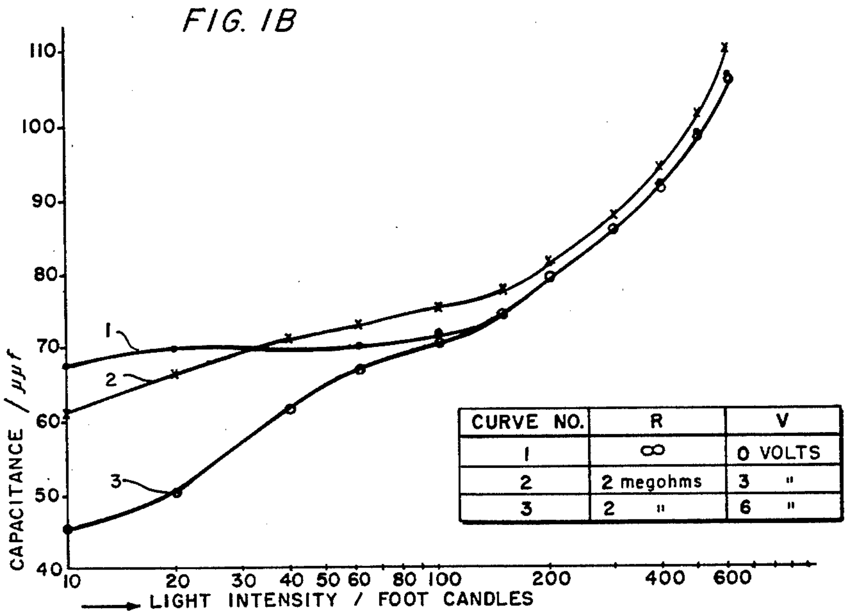
FIG. 1B shows curves illustrating the variation of capacitance obtained across that photodiode as a function of light intensity for various voltage bias conditions and various series resistances.
Figure 1A:
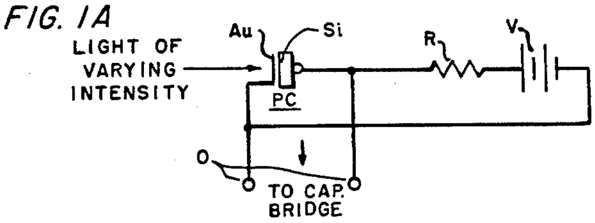
FIG. 1A shows diagrammatically one type of surface-barrier photodiode which could be used in the photoparametric control devices of the invention.

FIG. 1A shows diagrammatically one type of surface-barrier or depletion layer photodiode or cell used in the control devices of the invention, consisting of gold (Au) film on an N-type silicon (Si) semiconductor with the associated series resistance R and D.-C. voltage biasing source V, to the sensitive gold film of which cell a beam of varying intensity light is applied to provide a variable capacitance across the output terminals O. FIG. 1B shows three curves, designated 1, 2 and 3, showing the variation of capacitance obtained across the output terminals O of the photocell of FIG. 1A in response to variation in light intensity in foot candles for various bias conditions and various values of series resistance R indicated on the associated table. The time constant of this capacitance change is given by the transit time of carriers through the barrier or depletion layer, by the diffusion time of carriers from their place of optical generation in response to the modulated light in the bulk material to the barrier, and by the RC time constant of the photocell capacitance with the internal and external series resistance. Photocells of this type have been built with time constants of 10 mμsec. and an active area of 1 mm.[2]. It is thus obvious that such photocells may be used as photocapacitors with fast response times if the active area is sufficiently small and the series resistances are reduced to low values. The resonance frequency of an LC circuit containing the photocell or photocapacitor and tuned to, for example, 10 mc. in the dark will typically drop by 4.5 percent under a light intensity of 100 foot candles (ft.-c.) and 10 percent for 600 ft.-c. The circuit will respond without noticeable delay to available light pulses of 2-μsec. duration, but the cell used should itself resolve pulse widths of 10–20 mμsec. The availability of such variable photocapacitors with fast response time makes possible their use for application of the parametric amplifier principle to photodetection.

Figure 2:
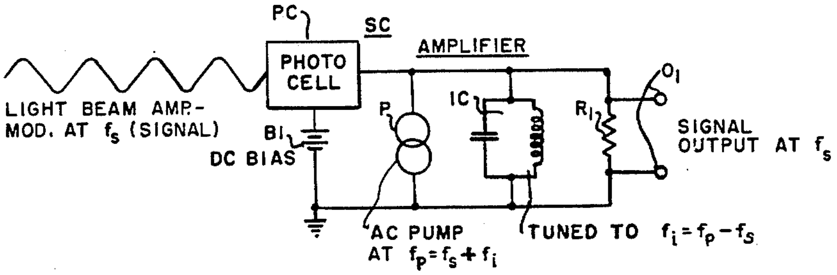
FIGS. 2 and 3 show circuit diagrams of different modifications of a reactance (parametric) amplifier embodying the invention.

In the parametric amplifier circuit of FIG. 2, a variable photocapacitor or photocell PC of the surface-barrier or depletion layer type comprising a semiconductor crystal and a metal film thereon, such as N-type silicon plated with a gold film illustrated in FIG. 1A, is utilized as a variable reactance coupling two high-Q resonant circuits, the signal circuit SC tuned to the signal frequency $f_s$ and the idler circuit IC tuned to the difference frequency $f_i=f_p-f_s$, connected across the photocell PC. Information in the form of variable intensity modulation at a frequency $f_s$ of a light beam, which may comprise visible light or infrared or ultraviolet radiation, represented by the curved line in a figure so labeled, is directed to the sensitive surface of the photocell PC, as shown, and generates an R.-F. current of frequency $f_s$ in the signal circuit SC of which the photocell PC is an integral part. The modulated light impinging on the depletion layer of the photocell PC in the manner described in connection with FIG. 1A optically generates therein a varying current producing a varying voltage which creates the fast response varying capacitance across the device PC proportional to the varying intensity of the original modulated light. The pump or local oscillator P supplies A.-C. power at the frequency $f_p=f_s+f_i$ to the photocell PC making its photoreactance time varying at that frequency in the usual parametric amplifier manner. A D.-C. voltage bias V of suitable value is applied to the photocell PC by the battery B1 to give the correct operating point of the capacitance vs. voltage variations. Blocking capacitors (not shown) may have to be used to prevent this bias from shorting to ground. The idler circuit IC tuned to the difference frequency $f_i=f_p-f_s$ performs its usual function in the parametric amplifier, that is, to absorb the idler frequency $f_i$.

The modulated signal at the frequency $f_s$ and the capacitance variation at a frequency $f_p$ are combined in the photocell PC to generate voltages comprising the sum and difference of these frequencies across the photocell. A low noise amplified signal output at the frequency $f_s$ which contains the signal information of the original signal modulated beam may be taken off at output terminals $O_1$ connected across a resistor R1 in series with the signal circuit SC.

Figure 3:
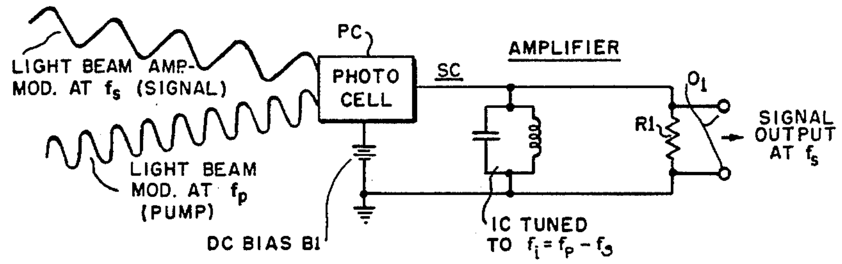

The circuit of FIG. 3 differs from that of FIG. 2 only in that the pump power for the parametric amplifier is obtained by "detection" of a second, more intense, light beam modulated at the pump frequency $f_p$ which is applied to the active surface of the photocell PC, in addition to the signal modulated beam at the frequency $f_s$. Thus, the pump energy may be derived from a light source some distance away from the parametric amplifier circuit proper.

There are many other circuit arrangements similar to the above illustrated in FIGS. 2 and 3 where harmonics and/or sub-harmonics of the signal and/or pump frequencies can be used to give amplification. Some examples are: (*a*) The pump frequency could be some sub-harmonic of $(f_s+f_i)$; and (*b*) the pump frequency could be identical with, or some harmonic of, the signal frequency $f_s$, while the idler frequency would be $f_i=f_p-f_s$.

Figure 4:
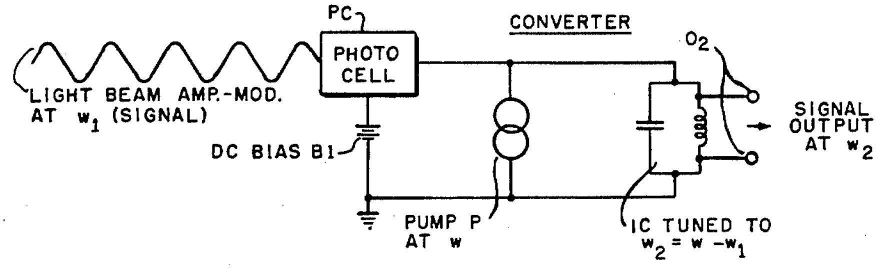
FIGS. 4 and 5 show block circuit diagrams of different modifications of frequency conversion circuits embodying the invention.

FIG. 4 shows the application of the parametric amplifier principle to frequency conversion where the signal information modulated at a frequency $w_1$ on a light beam is converted to that information at another frequency $w_2$. The circuit is identical with that of the amplifier circuit of FIG. 2 except that the signal output at the frequency $w_2$ or $f_i$, instead of being taken at output terminals $O_1$ across the series resistor R1 in the signal circuit is taken at output terminals $O_2$ connected across the idler circuit IC tuned to the difference frequency $f_i=w-w_1$ and $f_p-f_s$, where $w$ or $f_p$ is the frequency of the pump source P.

Figure 5:
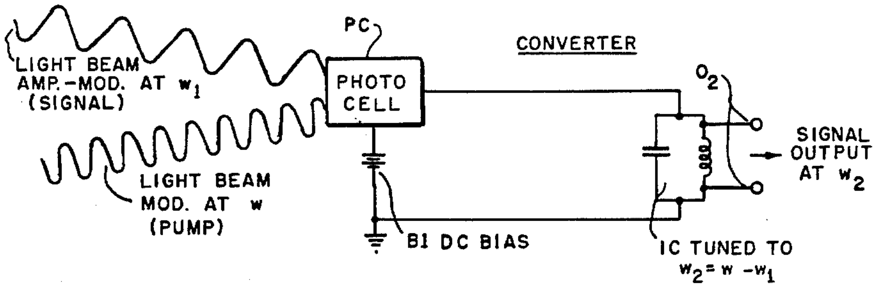

FIG. 5 shows another converter arrangement that is identical with that of FIG. 4 except that the pump source P is obtained by "detection" of a second, more intense, light beam modulated at the pump frequency $w$ applied to the photocell PC in the manner similar to that of FIG. 3. By proper selection of the conversion frequencies, the circuits of FIGS. 4 and 5 may be utilized to provide an upper sideband up-converter, lower sideband up-converter, lower sideband down-converter or upper sideband down-converter.

Figure 6:
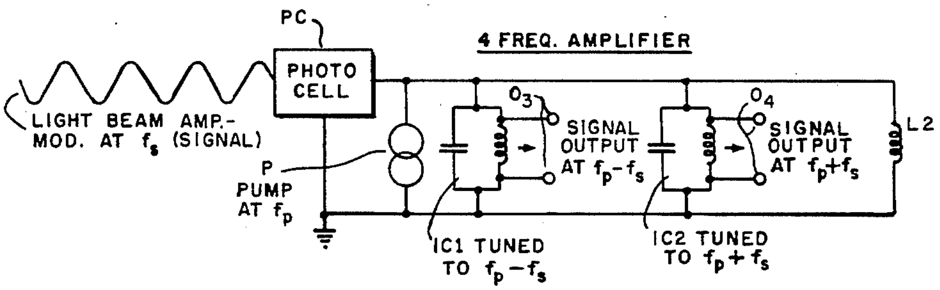
FIG. 6 shows a block diagram of a four-frequency double sideband up-converter embodying the invention.

A special case of frequency conversion is the four-frequency amplifier (double sideband up-converter) illustrated in FIG. 6. As shown in that figure, a light beam intensity modulated with information at the frequency $f_s$ is applied to the photocell PC and its photoreactance is varied at the A.-C. frequency $f_p$ by the pump source P. A high-Q resonant signal circuit SC including the series inductance L2 tuned to the signal frequency $f_s$ is coupled by the variable photoreactance of the photocell PC to the high-Q resonant idler circuit IC1 tuned to the difference frequency $f_p-f_s$, and is connected across the output terminals of the photocell PC. A low noise, amplified signal output at the lower sideband $f_p-f_s$ is taken out at the output terminals $O_3$ across that idler circuit. A second resonant idler circuit IC2 tuned to the sum sideband frequency $f_p+f_s$ is connected in parallel to the first tuned circuit IC1, and a low noise, amplified signal output of that frequency is taken off at output terminals $O_4$ connected across the tuned circuit IC2.

Figure 7:
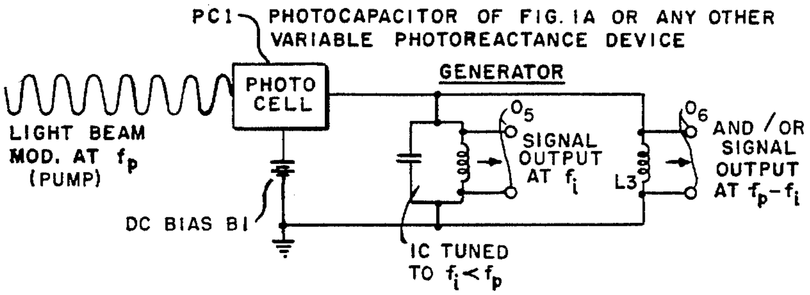
FIG. 7 shows a block diagram of a frequency generator embodying the invention.

FIG. 7 shows a frequency generator utilizing the parametric amplifier principle in accordance with the invention. It includes a photocapacitor of the depletion layer, semiconductor type such as illustrated in FIG. 1A, or any other variable photoreactance device PC1 coupling the closed resonant signal circuit SC including the inductance coil L3 in series therewith to the parallel inductance-capacitance resonant idler circuit IC. The pump power for varying the photoreactance device PC is a beam of light modulated at the pump frequency $f_p$ directed to its sensitive surface. The idler circuit IC is tuned to any frequency $f_i$ which is less than the pump frequency $f_p$. A D.-C. voltage bias of suitable value is provided by the battery B1 to give the correct operating point of the capacitance vs. voltage variations produced by the device PC. Since the semiconductor device must be a negative resistance, if the pump power provided by the modulated light beam of frequency $f_p$ is increased beyond a certain (obtainable) value, the circuit described will be set into oscillation at either or both of the frequencies $f_i$ or $f_p-f_i$. The generated output signal of the frequency $f_p-f_i$ may be taken off at terminals $O_6$ connected across the series inductance L3 in the signal circuit SC, and the generated output signal of the frequency $f_1$ may be taken off at the output terminals $O_5$ connected across the idler circuit IC.

Figure 8:
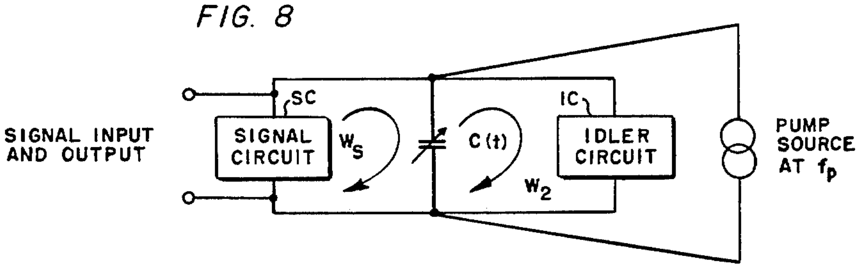
FIG. 8 shows a block diagram of the photoparametric amplifier of the invention drawn in a somewhat different form used in connection with a mathematical explanation of its operation.

An explanation of how the parametric amplifier of FIGS. 2 and 3 works is given mathematically in connection with the circuit redrawn in FIG. 8. As shown in FIG. 8, the signal circuit for simplification of explanation consists of a high-Q resonant circuit (resonant at the signal frequency $f_s=w_s/2\pi$) which includes the variable photocapacitor $C(t)$; and an idler circuit which consists of a high-Q resonant circuit (resonant at the idler frequency $f_1=w_1/2\pi=f_p-f_s$) which also includes the variable photocapacitor. A suitable pump source at a frequency $f_p=f_s+f_1$ is applied to the photocapacitor. A signal of frequency $f_s$ is introduced into the signal circuit, which introduces in the signal circuit a current $i_s=i_{s0}\cos(w_st+\phi)$, where $\phi$ is the phase of the signal with respect to the pump. This current develops a voltage across the photocapacitor $C(t)$, which is time varying due to the pump voltage variation of the photocapacitor.

For the sake of a simplified discussion, assume that the pump varies the photocapacitance in the following manner:

$$1/C=g_1\cos w_pt$$

Then the voltage developed across the photocapacitor is:

$$V=q/C=(1/C)\int i_sdt$$

where $q$=change in charge due to input signal.

Therefore:

$$V=g_1\cos w_pt\int i_{s0}\cos(w_st+\phi)dt$$

and:

$$V=(g_1i_{s0}/w_s)\cos(w_pt)\sin(w_st+\phi)$$

If one now uses the standard trigonometric identities to transform this into the sum and difference terms, one obtains:

$$V=g_1i_{s0}/2w_s[\sin\{(w_p+w_s)t+\phi\}-\sin\{(w_p-w_s)t-\phi\}]$$

Note that if $w_p=w_s+w_1$, then $w_p-w_s=w_1$ and that this voltage must be balanced by a voltage at frequency $w_1$ in the idler circuit. Since only the $(w_p-w_s)=w_1$ term can exist in the high-Q circuit $Q_1(w_1)$, this gives rise to a current which flows in this circuit (idler) only.

$i_1=(i_{s0}g_1/2w_sR_1)\sin(w_1t-\phi)$, where $R_1$=that resistance in the idler circuit by which the "induced" voltage creates a current flow in the idler circuit.

This idler current interacts with the time-varying photocapacitor (from the pump) to develop a voltage across it which introduces an additional current into the signal circuit.

Thus:

$$V=(1/C)\int idt=g_1\cos w_pt\int i_1dt$$
$$V=g_1\cos(w_pt)\,(i_{s0}/2w_sR_1w_1)\int\sin(w_1t-\phi)dt$$
$$V=-\{i_{s0}g_1^2/2w_sw_1R_1\}\cos(w_pt)\cos(w_1t-\phi)$$

Likewise, using the standard trigonometric transformations:

$$V=-i_{s0}\{g_1^2/4w_sw_1R_1\}[\cos\{(w_p+w_1)t-\phi\}+\cos\times\{(w_p-w_1)t+\phi\}]$$

As before, this voltage must be balanced in the signal circuit and this new voltage gives rise to an additional current $\Delta i_s$ in the signal circuit. Also note that $$w_p-w_1=w_s$$

and that only one current can flow in the high $Q=Q_s(w_s)$ signal circuit $Q_s(w)_s$.

Therefore, this additional current is:

$$\Delta i_s=\{i_{s0}g_1^2/4w_sw_1R_1R_s\}\cos(w_st+\phi)$$

Where $R_s$=that resistance in the signal circuit by which the "induced" voltage creates a current flow in the signal circuit.

Therefore, power gain is obtained since the signal input and output impedance is constant while the signal current is increased to the value:

$$i_{total}=i_s+\Delta i_s$$
$$i=\{1+g_1^2/4w_sw_1R_1R_s\}i_{s0}\cos(w_st+\phi)$$

Various modifications of the photoparametric control devices illustrated in the drawings and described above which are within the spirit and scope of the invention will occur to persons skilled in the art.

What is claimed is:

1. A parametric amplifier comprising in combination, a photocapacitor device consisting of a semiconductor crystal element with a metal film thereon having a depletion layer at the junction between the semiconductor and metal elements, a light beam intensity-modulated with information at a frequency $f_s$ directly applied to the sensitive metal film surface of said photocapacitor device resulting in the release of electrons entering the depletion layer and causing the generation of a signal current therein which results in turn in a varying capacitance at the frequency $f_s$ across the terminals of said device proportional to the varying intensity of the varying light beam, a pump source for varying the capacitance of said device at a frequency $f_p$ by applying a second, more intense, light beam modulated at the pump frequency $f_p$ to the photocapacitor device, a high-Q closed signal circuit including the variable capacitance of said device and resistance in series, in which an R.-F. current of frequency $f_s$ is generated by the modulated light beam, a high-Q parallel inductance-capacitance resonant circuit tuned to the difference frequency $f_1=f_p-f_s$ coupled to the signal circuit by said photocapacitor, the R.-F. signal current at the frequency $f_s$ and the capacitance variation of said photocapacitor at the frequency $f_p$ combining to generate voltages at the sum and difference of these frequencies across the capacitor, and output means for taking off an amplified, low noise, output signal of the frequency $f_s$ across said series resistance in said signal circuit or of the difference frequency $f_1$ across the idler circuit, the output signal in each case containing the information in the original modulated light beam.

2. A frequency converter comprising in combination, a photocell consisting of a semiconductor crystal with a metal film thereon having a depletion layer at the junction between the metal and semiconductor elements, a light beam intensity modulated with information at a frequency $f_s$ directly applied to the sensitive metal film surface of said photocell resulting in the release of electrons entering the depletion layer of said device causing the generation of a varying signal current in that layer which results in turn in a varying capacitance at the frequency $f_s$ across the terminals of the photocell proportional to the varying intensity of the modulated light beam, a pump source for varying the capacitance of said device at a frequency $f_p$ by applying a more intense light beam modulated at the pump frequency $f_p$ to the sensitive metal film surface of the photocell; a signal circuit including a high-Q closed inductance-capacitance idler circuit tuned to the difference frequency $f_1=f_p-f_s$ connected across the terminals of said photocell, the signal at a frequency $f_s$ generated in the circuit across the photocell by the modulated signal light beam and the capacitance variation of the photocell at the frequency $f_p$ combining to generate voltages at the sum and difference of these frequencies across the photocell, and output means connected across said idler circuit for taking off an amplified, low noise, output signal of the idler frequency $f_1$ containing the information of the original modulated light beam.

No references cited.